(12) United States Patent
Karim et al.

(10) Patent No.: US 9,486,785 B2
(45) Date of Patent: Nov. 8, 2016

(54) CATALYST AND PROCESS FOR THE PRODUCTION OF OLEFINS FROM SYNGAS

(71) Applicant: SAUDI BASIC INDUSTRIES CORPORATION, Riyadh (SA)

(72) Inventors: Khalid Karim, Riyadh (SA); Asad Ahmad Khan, Riyadh (SA); Mohammad Abdur Rakib, Riyadh (SA); Mohammed Al-Semahi, Riyadh (SA); Jayen Barochia, Riyadh (SA)

(73) Assignee: Saudi Basic Industries Corporation, Riyadh (SA)

( * ) Notice: Subject to any disclaimer, the term of this patent is extended or adjusted under 35 U.S.C. 154(b) by 0 days.

(21) Appl. No.: 14/907,854

(22) PCT Filed: Jul. 28, 2014

(86) PCT No.: PCT/IB2014/002426
§ 371 (c)(1),
(2) Date: Jan. 27, 2016

(87) PCT Pub. No.: WO2015/015313
PCT Pub. Date: Feb. 5, 2015

(65) Prior Publication Data
US 2016/0175819 A1    Jun. 23, 2016

Related U.S. Application Data

(60) Provisional application No. 61/860,484, filed on Jul. 31, 2013.

(51) Int. Cl.
*B01J 23/889* (2006.01)
*C10G 2/00* (2006.01)
*B01J 37/04* (2006.01)

(52) U.S. Cl.
CPC ............ *B01J 23/8892* (2013.01); *B01J 37/04* (2013.01); *C10G 2/332* (2013.01); *C10G 2/333* (2013.01); *B01J 2523/00* (2013.01); *C10G 2400/22* (2013.01)

(58) Field of Classification Search
CPC ............... B01J 2523/845; B01J 2523/847; B01J 37/04; B01J 23/8892; B01J 2523/17; B01J 2523/22; B01J 2523/41; B01J 2523/72; B01J 2523/27; C10G 2/333; C10G 2/332; C10G 2400/22
USPC .......................................... 502/241; 518/715
See application file for complete search history.

(56) References Cited

U.S. PATENT DOCUMENTS 7,304,012 B2   12/2007   Green et al.
7,341,976 B2    3/2008   Espinoza et al.
7,365,040 B2    4/2008   Van Berge et al.
8,071,655 B2   12/2011   Diehl et al.

FOREIGN PATENT DOCUMENTS

EP    1230146 A2    8/2002
EP    1432778 B2    6/2004
EP    2422876 A1    2/2012
WO    WO-01/36323   5/2001

OTHER PUBLICATIONS

Khodakov A, et al. (2007) Advances in the Development of Novel Cobalt Fischer-Tropsch Catalysts for Synthesis of Long-chain Hydrocarbons and Clean Fuels. Chem. Rev., 107:1692-1744.
Ishihara, et al., "Hydrogenation of carbon monoxide over the mixed catalysts composed of cobalt-nickel/manganese oxide-zirconium oxide and zeolite catalysts", Applied Catalysts vol. 75, No. 1, (1991) (pp. 225-235).
Varma, et al., "Manganese oxide supported cobalt-nickel catalysts for carbon monoxide hydrogenation", The Canadian Journal of Chemical Engineering, vol. 63, No. 1 (1985) (pp. 72-80).
International Search Report issued on Jan. 30, 2015 for international application PCT/IB2014/002426, filed on Jul. 28, 2014 and published as WO 2015/015313 on Feb. 5, 2015 (Applicant—Saudi Basic Industries Corporation // Inventor—Karim, et al.) (3 pages).
Written Opinion of the International Searching Authority issued on Jan. 30, 2015 for international application PCT/IB2014/002426, filed on Jul. 28, 2014 and published as WO 2015/015313 on Feb. 5, 2015 (Applicant—Saudi Basic Industries Corporation // Inventor—Karim, et al.) (5 pages).

*Primary Examiner* — Jafar Parsa
(74) *Attorney, Agent, or Firm* — Ballard Spahr LLP

(57) ABSTRACT

The present disclosures and inventions relate to a catalyst or catalyst composition and the methods of making and using the catalyst or catalyst composition. In one aspect, the present disclosure relates to a catalyst composition that includes a catalyst having the formula $C_A C_B O_x$ and a catalyst support; a) $C_A$ is $Co_aMn_bX_d$, wherein X comprises Si, Ti, Cu, Zns Pd, or La or a combination thereof; a ranges from 0.8 to 1.2; b ranges from 0.1 to 1; and d ranges from 0 to 0.5; and b) $C_B$ is $Ni_eCu_fMg_hSi_m$, wherein e ranges from about 0.8 to 1.2; f ranges from 0 to 1; h ranges from 0 to 0.5; and m ranges from 0 to 0.5; wherein $O_x$ is determined by the valence requirements of the other elements present, wherein in the catalyst support consists essentially of magnesia, alumina, silica, titanic, carbon, or zeolite, or a combination thereof; and wherein the catalyst composition converts synthesis gas to at least one olefin.

20 Claims, No Drawings

CATALYST AND PROCESS FOR THE PRODUCTION OF OLEFINS FROM SYNGAS

CROSS-REFERENCE TO RELATED APPLICATION

This is a U.S. National Phase Application of International Application No. PCT/IB2014/002426, filed Jul. 28, 2014, which claims the benefit of U.S. Provisional Application No. 61/860,484, filed on Jul. 31, 2013, which are both incorporated herein by reference in their entirety.

BACKGROUND

Syngas (mixtures of hydrogen and carbon monoxide) can be readily produced from either coal or methane (natural gas) by methods well known in the art and widely commercially practiced around the world. A number of well-known industrial processes use syngas for producing various oxygenated organic chemicals. The Fischer-Tropsch catalytic process for catalytically producing hydrocarbons from syngas was initially discovered and developed in the 1920's, and was used in South Africa for many years to produce gasoline range hydrocarbons as automotive fuels. The catalysts typically comprised iron or cobalt supported on alumina or titania, and promoters, such as rhenium, zirconium, manganese, and the like were sometimes used with cobalt catalysts, to improve various aspects of catalytic performance. The products were typically gasoline-range hydrocarbon liquids having six or more carbon atoms, along with heavier hydrocarbon products.

Accordingly, there remains a need for a catalyst to produce an olefin from syngas that can have low methane formation, low or little carbon dioxide formation, high conversion or activity, and/or high total hydrocarbon formation.

SUMMARY

In accordance with the purposes of the invention, as embodied and broadly described herein, in one aspect, the present disclosure relates to a catalyst comprising $C_A C_B O_x$; wherein: a) $C_A$ is $Co_a Mn_b X_d$, wherein X comprises Si, Ti, Cu, Zn, Pd, or La or a combination thereof; a ranges from 0.8 to 1.2; b ranges from 0.1 to 1; and d ranges from 0 to 0.5; and b) $C_B$ is $Ni_e Cu_f Mg_h Si_m$, wherein e ranges from about 0.8 to 1.2; f ranges from 0 to 1; h ranges from 0 to 0.5; and m ranges from 0 to 0.5; wherein $O_x$ is determined by the valence requirements of the other elements present; and wherein the catalyst converts synthesis gas to at least one olefin.

Disclosed are methods of making and using the catalyst or catalyst composition.

Also disclosed are methods for using a catalyst or catalyst composition comprising: a) contacting the disclosed catalyst or the catalyst composition with a synthesis gas; and b) forming a product mixture comprising at least one olefin.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

DESCRIPTION

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

A. Definitions

As used herein, nomenclature for compounds, including organic compounds, can be given using common names, IUPAC, IUBMB, or CAS recommendations for nomenclature. When one or more stereochemical features are present, Cahn-Ingold-Prelog rules for stereochemistry can be employed to designate stereochemical priority, E/Z specification, and the like. One of skill in the art can readily ascertain the structure of a compound if given a name, either by systemic reduction of the compound structure using naming conventions, or by commercially available software, such as CHEMDRAW™ (Cambridgesoft Corporation, U.S.A.).

As used in the specification and the appended claims, the singular forms "a," "an" and "the" include plural referents unless the context clearly dictates otherwise. Thus, for example, reference to "a functional group," "an alkyl," or "a residue" includes mixtures of two or more such functional groups, alkyls, or residues, and the like.

Ranges can be expressed herein as from "about" one particular value, and/or to "about" another particular value. When such a range is expressed, a further aspect includes from the one particular value and/or to the other particular value. Similarly, when values are expressed as approximations, by use of the antecedent "about," it will be understood that the particular value forms a further aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

As used herein, the terms "optional" or "optionally" means that the subsequently described event or circumstance can or can not occur, and that the description includes instances where said event or circumstance occurs and instances where it does not.

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valences of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc. It is also contemplated that, in certain aspects, unless expressly indicated to the contrary, individual substituents can be further optionally substituted (i.e., further substituted or unsubstituted).

Certain materials, compounds, compositions, and components disclosed herein can be obtained commercially or readily synthesized using techniques generally known to those of skill in the art. For example, the starting materials and reagents used in preparing the disclosed compounds and compositions are either available from commercial suppliers such as Aldrich Chemical Co., (Milwaukee, Wis.), Acros Organics (Morris Plains, N.J.), Fisher Scientific (Pittsburgh, Pa.), or Sigma (St. Louis, Mo.) or are prepared by methods known to those skilled in the art following procedures set forth in references such as Fieser and Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991); March's Advanced Organic Chemistry, (John Wiley and Sons, 4th Edition); and Larock's Comprehensive Organic Transformations (VCH Publishers Inc., 1989).

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds can not be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

B. Catalyst and Catalyst Composition

1. Catalyst

In one aspect, the present disclosure relates to a catalyst comprising $C_A C_B O_x$;

wherein:
  a. $C_A$ is $Co_a Mn_b X_d$, wherein
    X comprises Si, Ti, Cu, Zn, Pd, or La or a combination thereof;
    a ranges from 0.8 to 1.2;
    b ranges from 0.1 to 1; and
    d ranges from 0 to 0.5; and b. $C_B$ is $Ni_eCu_fMg_hSi_m$, wherein
  e ranges from about 0.8 to 1.2;
  f ranges from 0 to 1;
  h ranges from 0 to 0.5; and
  m ranges from 0 to 0.5; and
wherein $O_x$ is determined by the valence requirements of the other elements present; and wherein the catalyst converts synthesis gas to an olefin.

In one aspect, X comprises Si, Ti, Cu, Zn, Pd, or La or combination thereof. In another aspect, the X comprises at least one of Si, Ti, Cu, Zn, Pd, or La. In a further aspect, the X comprises one or more of Si, Ti, Cu, Zn, Pd, or La. In an even further aspect, X is Si, Cu, or Zn or a combination thereof. In a further aspect, X consists of Si, Ti, Cu, Zn, Pd, or La or a combination thereof.

In one aspect, $O_x$ is determined by the valence requirements of the other elements present.

In one aspect, the catalyst does not comprise an alkyl or an acyl group. In another aspect, the catalyst does not comprise a group comprising a carbon chain.

In one aspect, a ranges from 0.8 to 1.2, including exemplary values 0.9, 1.0, and 1.1. In a further aspect, the range can be derived from any two exemplary values. For example, a can range from 0.9 to 1.2.

In one aspect, b ranges from 0.1 to 1, including exemplary values of 0.2, 0.3, 0.4, 0.5, 0.6, 0.7, 0.8, and 0.9. In a further aspect, the range can be derived from any two exemplary values. For example, b can range from 0.2 to 1.

In one aspect, the individual d ranges for each X ranges from 0 to 0.5, including exemplary values of 0.1, 0.2, 0.3, and 0.4. In a further aspect, the range can be derived from any two exemplary values. For example, d can range from 0.1 to 0.5.

In one aspect, the total d ranges from 0 to 0.5, including exemplary values of 0.1, 0.2, 0.3, and 0.4. In a further aspect, the range can be derived from any two exemplary values. For example, the total d can range from 0.1 to 0.5.

In one aspect, e ranges from about 0.8 to 1.2, including exemplary values of 0.9, 1.0, and 1.1. In a further aspect, the range can be derived from any two exemplary values. For example, e can range from 0.9 to 1.2.

In one aspect, f ranges from 0 to 1, including exemplary values of 0.1, 0.2, 0.3, 0.4, 0.5, 0.6, 0.7, 0.8, and 0.9. In a further aspect, the range can be derived from any two exemplary values. For example, f can range from 0.1 to 1.

In one aspect, h ranges from 0 to 0.5, including exemplary values of 0.1, 0.2, 0.3, and 0.4. In a further aspect, the range can be derived from any two exemplary values. For example, h can range from 0.1 to 0.5.

In one aspect, m ranges from 0 to 0.5, including exemplary values of 0.1, 0.2, 0.3, and 0.4. In a further aspect, the range can be derived from any two exemplary values. For example, m can range from 0.1 to 0.5.

In one aspect, the catalyst can have any suitable structure.

In one aspect, the percentage of $C_A$ ranges from 10 wt % to 90 wt %, based on the total weight of the catalyst, including exemplary values of 15 wt %, 20 wt %, 25 wt %, 30 wt %, 35 wt %, wt %, wt %, 50 wt %, 55 wt %, 60 wt %, 65 wt %, 70 wt %, 75 wt %, 80 wt %, and 85 wt %. In a further aspect, the range can be derived from any two exemplary values. For example, the percentage of $C_A$ can range from 35 wt % to 65 wt %, based on the total weight of the catalyst.

In one aspect, the percentage of $C_B$ from 10 wt % to 90 wt %, based on the total weight of the catalyst, including exemplary values of 15 wt %, 20 wt %, 25 wt %, 30 wt %, 35 wt %, wt %, 45 wt %, 50 wt %, 55 wt %, 60 wt %, 65 wt %, 70 wt %, 75 wt %, 80 wt %, and 85 wt %. In a further aspect, the range can be derived from any two exemplary values. For example, the percentage of $C_B$ can range from 35 wt % to 65 wt %, based on the total weight of the catalyst.

In one aspect, the percentage of $C_A$ and the percentage of $C_B$ combine to equal 100%, based on the total weight of the catalyst. In another aspect, the catalyst consists essentially of $C_A$ and $C_B$. In one aspect, the percentage of $C_A$ and the percentage of $C_B$ and the oxygen combine to equal 100%, based on the total weight of the catalyst. In another aspect, the catalyst consists essentially of $C_A$, of $C_B$, and of oxygen.

The catalysts disclosed herein can include the catalyst compositions disclosed herein and be prepared by or used by the methods disclosed herein.

2. Catalyst Composition

In one aspect, disclosed herein is a catalyst composition comprising the catalyst and/or a catalyst support. The catalyst composition comprises a catalyst comprising $C_A C_B O_x$; wherein: a) $C_A$ is $Co_aMn_bX_d$, wherein X is Si, Ti, Cu, Zn, Pd, or La or a combination thereof; a ranges from 0.8 to 1.2; b ranges from 0.1 to 1; and d ranges from 0 to 0.5; b) $C_B$ is $Ni_eCu_fMg_hSi_m$, wherein e ranges from about 0.8 to 1.2; f ranges from 0 to 1; h ranges from 0 to 0.5; and m ranges from 0 to 0.5; wherein $O_x$ is determined by the valence requirements of the other elements present; and; wherein the catalyst converts synthesis gas to at least one olefin; and comprising a catalyst support comprising magnesia, alumina, silica, zirconia, titania, carbon, or zeolite, or a combination thereof.

In another aspect, the catalyst support comprises magnesia, alumina, silica, zirconia, titania, carbon, or zeolite, or a combination thereof.

In one aspect, the catalyst composition comprises a single support. In another aspect, the catalyst composition comprises more than one support.

In one aspect, the catalyst composition or the catalyst support can be in fluidized or shaped form. In another aspect, the catalyst composition or catalyst support can be in any suitable form.

In one aspect, the catalyst composition does not comprise boehmite. In another aspect, the catalyst composition does not comprise a polar organic solvent. In a further aspect, the catalyst composition is substantially free from boehmite and/or a polar organic solvent. In a yet further aspect, the catalyst composition comprises trace amounts of boehmite or a polar organic solvent.

In addition to the foregoing components, the disclosed catalyst compositions can optionally comprise a balance amount of one or more additive materials ordinarily incorporated into catalyst compositions of this type, with the proviso that the additives are selected so as to not significantly adversely affect the desired properties of the catalyst composition. Combinations of additives can be used. Such additives can be mixed at a suitable time during the mixing of the components for forming the composition. Exemplary and non-limiting examples of additive materials that can be present in the disclosed catalyst compositions include an antioxidant, a stabilizer (including for example a thermal stabilizer, a hydrolytic stabilizer, or a light stabilizer), UV absorbing additive, plasticizer, lubricant, mold release agent, acid scavenger, antistatic agent, or colorant (e.g., pigment and/or dye), or any combination thereof.

In one aspect, the acid scavenger comprises phosphorous acid, phosphoric acid, mono zinc phosphate, mono sodium phosphate, or sodium acid pyrophosphate or a combination thereof.

Suitable antioxidant additives include, for example, organic phosphites such as tris(nonyl phenyl)phosphite, tris(2,4-di-t-butylphenyl)phosphite, bis(2,4-di-t-butylphenyl) pentaerythritol diphosphite, distearyl pentaerythritol diphosphite or the like, or a combination thereof; alkylated monophenols or polyphenols; alkylated reaction products of polyphenols with dienes, such as tetrakis[methylene(3,5-di-tert-butyl-4-hydroxyhydrocinnamate)]methane, or the like, or a combination thereof; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecyl-thiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like, or a combination thereof; amides of beta-(3,5-di-tert-butyl-4-hydroxyphenyl)-propionic acid or the like, or a combination thereof, or combinations comprising at least one of the foregoing antioxidants.

In one aspect, the antioxidant is present in an amount from about 0.1 wt % to about 1 wt %, based on the total weight of the catalyst composition. In another aspect, the antioxidant is present in an amount from about 0.1 wt % to about 0.9 wt %, based on the total weight of the catalyst composition. In still another aspect, the antioxidant is present in an amount from about 0.1 wt % to about 0.7 wt %, based on the total weight of the catalyst composition.

Suitable thermal stabilizer additives include, for example, organic phosphites such as triphenyl phosphite, tris-(2,6-dimethylphenyl)phosphite, tris-(mixed mono- and di-nonylphenyl)phosphite or the like, or a combination thereof; phosphonates such as dimethylbenzene phosphonate or the like, or a combination thereof, organic phosphates such as trimethyl phosphate, thioesters such as pentaerythritol beta-laurylthiopropionate, and the like, or combinations comprising at least one of the foregoing thermal stabilizers.

In one aspect, the thermal stabilizer can be present in an amount from about 0.05 wt % to about 1.0 wt %, based on the total weight of the catalyst composition. In another aspect, the thermal stabilizer is present in an amount from about 0.1 wt % to about 1.0 wt %, based on the total weight of the catalyst composition. In still another aspect, the thermal stabilizer is present in an amount from about 0.1 wt % to about 0.9 wt %, based on the total weight of the catalyst composition. In still another aspect, the thermal stabilizer is present in an amount from about 0.05 wt % to about 1.0 wt %, based on the total weight of the catalyst composition.

In a further aspect, light stabilizers and/or ultraviolet light (UV) absorbing additives can also be used. Suitable light stabilizer additives include, for example, benzotriazoles such as 2-(2-hydroxy-5-methylphenyl)benzotriazole, 2-(2-hydroxy-5-tert-octylphenyl)-benzotriazole and benzophenones such as 2-hydroxy-4-n-octoxy benzophenone, or the like, or a combination thereof, or combinations comprising at least one of the foregoing light stabilizers. Light stabilizers are generally used in amounts of about 0.01 wt % to about 10 wt %, based on the total weight of the catalyst composition, optionally about 0.1 wt % to about 1 wt %, based on the total weight of the catalyst composition.

In a further aspect, suitable UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[[(2-cyano-3,3-diphenylacryloyl)oxy]-2,2-bis[[(2-cyano-3,3-diphenyl-acryloyl)oxy]methyl]propane (UVINUL™ 3030); 2,2'-(1,4-phenylene)bis(4H-3,1-benzoxazin-4-one); 1,3-bis[[(2-cyano-3,3-diphenylacryloyl)oxy]-2,2-bis[[(2-cyano-3,3-diphenyl-acryloyl)oxy]methyl]propane; nano-size inorganic materials such as titanium oxide, cerium oxide, and zinc oxide, all with particle size less than about 100 nanometers; or the like, or combinations comprising at least one of the foregoing UV absorbers. UV absorbers are generally used in amounts of about 0.1 wt % to about 5 wt %, based on the total weight of the catalyst composition.

In a further aspect, colorants such as pigment and/or dye additives can also be present. Suitable pigments include for example, inorganic pigments such as metal oxides and mixed metal oxides such as zinc oxide, titanium dioxides, iron oxides or the like, or a combination thereof; sulfides such as zinc sulfides, or the like, or a combination thereof; aluminates; sodium sulfo-silicates sulfates, chromates, or the like, or a combination thereof; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations comprising at least one of the foregoing pigments. Pigments are generally used in amounts of about 0.01 wt % to about 10 wt %, based on the total weight of the catalyst composition.

In a further aspect, suitable dyes are generally organic materials and include, for example, coumarin dyes such as coumarin 460 (blue), coumarin 6 (green), nile red or the like, or a combination thereof; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like, or a combination thereof; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3'',5''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene; chrysene; rubrene; coronene, or the like, or a combination thereof, or amounts of about 0.1 to about 10 ppm.

The catalyst compositions disclosed herein can include the catalysts disclosed herein and be prepared or used by the methods disclosed herein.

C. Methods of Making the Catalyst and Catalyst Composition

Also disclosed herein are methods of making compounds useful as a catalyst or a catalyst composition. In another aspect, disclosed herein are methods of making compounds useful as a catalyst or a catalyst composition for converting synthesis gas to an olefin.

In one aspect, the method of making $C_A$ comprises using any suitable reaction methods or suitable reaction conditions. In another aspect, the method of making $C_A$ can comprise mixing the compounds and heating the mixture.

In one aspect, the method of making the catalyst or catalyst composition comprises adding cobalt in any suitable form. In another aspect, cobalt can be added using an aqueous solution of a cobalt salt, e.g., chloride, bromide, iodide, fluoride, nitrate, sulfate, perchlorate, acetate, acetyl acetonate, phosphate, carbonate, or the like, or a combination thereof. In a further aspect, the cobalt can be in the form of a hydrate. In a yet further aspect, the cobalt comprises cobalt nitrate hexahydrate.

In one aspect, the cobalt can be added to the catalyst or catalyst composition in a solution with a molarity ranging from 1 M to 15 M, including exemplary values of 1.5 M, 2 M, 2.5 M, 3 M, 3.5 M, 4 M, 4.5 M, 5 M, 5.5 M, 6 M, 6.5 M, 7 M, 7.5 M, 8 M, 8.5 M, 9 M, 9.5 M, 10 M, 10.5 M, 11 M, 11.5 M, 12 M, 12.5 M, 13 M, 13.5 M, 14 M, and 14.5 M. In a further aspect, the molarity can be in a range derived from any two exemplary values. For example, the cobalt can be added to the catalyst or catalyst composition in a solution with a molarity ranging from 7 M to 13 M.

In one aspect, the method of making the catalyst or catalyst composition comprises adding manganese in any suitable form. In another aspect, manganese can be added using an aqueous solution of a manganese salt, e.g., chloride, bromide, iodide, fluoride, nitrate, sulfate, perchlorate, acetate, acetyl acetonate, phosphate, carbonate, or the like, or a combination thereof. In a further aspect, the manganese can be in the form of a hydrate. In a yet further aspect, the manganese comprises manganese nitrate tetrahydrate.

In one aspect, the manganese can be added to the catalyst or catalyst composition in a solution with a molarity ranging from 1 M to 15 M, including exemplary values of 1.5 M, 2 M, 2.5 M, 3 M, 3.5 M, 4 M, 4.5 M, 5 M, 5.5 M, 6 M, 6.5 M, 7 M, 7.5 M, 8 M, 8.5 M, 9 M, 9.5 M, 10 M, 10.5 M, 11 M, 11.5 M, 12 M, 12.5 M, 13 M, 13.5 M, 14 M, and 14.5 M. In a further aspect, the molarity can be in a range derived from any two exemplary values. For example, the manganese can be added to the catalyst or catalyst composition in a solution with a molarity ranging from 7 M to 13 M.

In a further aspect, X comprises Si, Ti, Cu, Zn, Pd, or La or a combination thereof. In another aspect, the method of making the catalyst or catalyst composition comprises adding X in any suitable form. In another aspect, X can be added using a salt, e.g., chloride, bromide, iodide, fluoride, nitrate, sulfate, perchlorate, acetate, acetyl acetonate, phosphate, carbonate, or the like, or a combination thereof. In a further aspect, the X can be in the form of a hydrate. In a yet further aspect, the X comprises zinc nitrate. In an even further aspect, the X can be in the elemental form. In one aspect, X can comprise one or more of Si, Ti, Cu, Zn, Pd, or La. In another aspect, X comprises one of Si, Ti, Cu, Zn, Pd, or La. In another aspect, one or more of Si, Ti, Cu, Zn, Pd, or La can be added in the form of an oxide. In a further aspect, the catalyst or catalyst composition can have Cu or Si or a combination thereof, added via $C_A$ and via $C_B$.

In one aspect, the X can be added to the catalyst or catalyst composition in a solution with a molarity ranging from 0.01 M to 15 M, including exemplary values of 0.02 M, 0.03 M, 0.04 M, 0.05 M, 0.06 M, 0.07 M, 0.08 M, 0.09 M, 0.1 M, 0.15 M, 0.2 M, 0.3 M, 0.4 M, 0.5 M, 0.6 M, 0.7 M, 0.8 M, 0.9 M, 1 M, 1.1 M, 1.2 M, 1.3 M, 1.4 M, 1.5 M, 2 M, 2.5 M, 3 M, 3.5 M, 4 M, 4.5 M, 5 M, 5.5 M, 6 M, 6.5 M, 7 M, 7.5 M, 8 M, 8.5 M, 9 M, 9.5 M, 10 M, 10.5 M, 11 M, 11.5 M, 12 M, 12.5 M, 13 M, 13.5 M, 14 M, and 14.5 M. In a further aspect, the molarity can be in a range derived from any two exemplary values. For example, the X can be added to the catalyst or catalyst composition in a solution with a molarity ranging from 0.01 M to 1 M.

In one aspect, the total X can be added to the catalyst or catalyst composition in a solution with a molarity ranging from 0.01 M to 15 M, including exemplary values of 0.02 M, 0.03 M, 0.04 M, 0.05 M, 0.06 M, 0.07 M, 0.08 M, 0.09 M, 0.1 M, 0.15 M, 0.2 M, 0.3 M, 0.4 M, 0.5 M, 0.6 M, 0.7 M, 0.8 M, 0.9 M, 1 M, 1.1 M, 1.2 M, 1.3 M, 1.4 M, 1.5 M, 2 M, 2.5 M, 3 M, 3.5 M, 4 M, 4.5 M, 5 M, 5.5 M, 6 M, 6.5 M, 7 M, 7.5 M, 8 M, 8.5 M, 9 M, 9.5 M, 10 M, 10.5 M, 11 M, 11.5 M, 12 M, 12.5 M, 13 M, 13.5 M, 14 M, and 14.5 M. In a further aspect, the molarity can be in a range derived from any two exemplary values. For example, the total X can be added to the catalyst or catalyst composition in a solution with a molarity ranging from 0.01 M to 1 M.

In one aspect, the method of making $C_B$ comprises using any suitable reaction methods or suitable reaction conditions. In another aspect, the method of making $C_B$ can comprise mixing the compounds and heating the mixture.

In one aspect, the method of making the catalyst or catalyst composition comprises adding nickel in any suitable form. In another aspect, nickel can be added using a nickel salt, e.g., chloride, bromide, iodide, fluoride, nitrate, sulfate, perchlorate, acetate, acetyl acetonate, phosphate, carbonate, or the like, or a combination thereof. In a further aspect, the nickel can be in the form of a hydrate. In a yet further aspect, the nickel comprises nickel nitrate.

In one aspect, the nickel can be added to the catalyst or catalyst composition in a solution with a molarity ranging from 0.01 M to 15 M, including exemplary values of 0.02 M, 0.03 M, 0.04 M, 0.05 M, 0.06 M, 0.07 M, 0.08 M, 0.09 M, 0.1 M, 0.15 M, 0.2 M, 0.3 M, 0.4 M, 0.5 M, 0.6 M, 0.7 M, 0.8 M, 0.9 M, 1 M, 1.1 M, 1.2 M, 1.3M, 1.4M, 1.5 M, 2 M, 2.5 M, 3M, 3.5 M, 4 M, 4.5 M, 5 M, 5.5 M, 6 M, 6.5 M, 7 M, 7.5 M, 8 M, 8.5 M, 9 M, 9.5 M, 10 M, 10.5 M, 11 M, 11.5 M, 12 M, 12.5 M, 13 M, 13.5 M, 14 M, and 14.5 M. In a further aspect, the molarity can be in a range derived from any two exemplary values. For example, the nickel can be added to the catalyst or catalyst composition in a solution with a molarity ranging from 0.01 M to 1 M.

In one aspect, the method of making the catalyst or catalyst composition comprises adding copper in any suitable form. In another aspect, copper can be added using a copper salt, e.g., chloride, bromide, iodide, fluoride, nitrate, sulfate, perchlorate, acetate, acetyl acetonate, phosphate, carbonate, or the like, or a combination thereof. In a further aspect, the copper can be in the form of a hydrate. In a yet further aspect, the copper comprises copper nitrate.

In one aspect, the copper can be added to the catalyst or catalyst composition in a solution with a molarity ranging from 0.01 M to 15 M, including exemplary values of 0.02 M, 0.03 M, 0.04 M, 0.05 M, 0.06 M, 0.07 M, 0.08 M, 0.09 M, 0.1 M, 0.15 M, 0.2 M, 0.3 M, 0.4 M, 0.5 M, 0.6 M, 0.7 M, 0.8 M, 0.9 M, 1 M, 1.1 M, 1.2 M, 1.3 M, 1.4 M, 1.5 M, 2 M, 2.5 M, 3 M, 3.5 M, 4 M, 4.5 M, 5 M, 5.5 M, 6 M, 6.5 M, 7 M, 7.5 M, 8 M, 8.5 M, 9 M, 9.5 M, 10 M, 10.5 M, 11 M, 11.5 M, 12 M, 12.5 M, 13 M, 13.5 M, 14 M, and 14.5 M. In a further aspect, the molarity can be in a range derived from any two exemplary values. For example, the copper can be added to the catalyst or catalyst composition in a solution with a molarity ranging from 0.01 M to 1 M.

In one aspect, the total copper from $C_A$ and $C_B$ can be added to the catalyst or catalyst composition in a solution with a total molarity ranging from 0.01 M to 15 M, including exemplary values of 0.02 M, 0.03 M, 0.04 M, 0.05 M, 0.06 M, 0.07 M, 0.08 M, 0.09 M, 0.1 M, 0.15 M, 0.2 M, 0.3 M, 0.4 M, 0.5 M, 0.6 M, 0.7 M, 0.8 M, 0.9 M, 1 M, 1.1 M, 1.2 M, 1.3 M, 1.4 M, 1.5 M, 2 M, 2.5 M, 3M, 3.5 M, 4 M, 4.5 M, 5 M, 5.5 M, 6 M, 6.5 M, 7 M, 7.5 M, 8 M, 8.5 M, 9 M, 9.5 M, 10 M, 10.5 M, 11 M, 11.5 M, 12M, 12.5 M, 13 M, 13.5 M, 14 M, and 14.5 M. In a further aspect, the molarity can be in a range derived from any two exemplary values. For example, the total copper can be added to the catalyst or catalyst composition in a solution with a total molarity ranging from 0.01 M to 1 M.

In one aspect, the method of making the catalyst or catalyst composition comprises adding magnesium in any suitable form. In another aspect, magnesium can be added using a magnesium salt, e.g., chloride, bromide, iodide, fluoride, nitrate, sulfate, perchlorate, acetate, acetyl acetonate, phosphate, carbonate, or the like, or a combination thereof. In a further aspect, the magnesium can be in the form of a hydrate. In a yet further aspect, the magnesium comprises magnesium chloride hexahydrate.

In one aspect, the magnesium can be added to the catalyst or catalyst composition in a solution with a molarity ranging from 0.01 M to 15 M, including exemplary values of 0.02 M, 0.03 M, 0.04 M, 0.05 M, 0.06 M, 0.07 M, 0.08 M, 0.09 M, 0.1 M, 0.15 M, 0.2 M, 0.3 M, 0.4 NI, 0.5 M, 0.6 M, 0.7 M, 0.8 M, 0.9 M, 1 M, 1.1 M, 1.2 M, 1.3 M, 1.4 M, 1.5 M, 2 M, 2.5 M, 3 M, 3.5 M, 4 M, 4.5 M, 5 M, 5.5 M, 6 M, 6.5 M, 7 M, 7.5 M, 8 M, 8.5 M, 9 M, 9.5 M, 10 M, 10.5 M, 11 M, 11.5 M, 12 M, 12.5 M, 13 M, 13.5 M, 14 M, and 14.5 M. In a further aspect, the molarity can be in a range derived from any two exemplary values. For example, the magnesium can be added to the catalyst or catalyst composition in a solution with a molarity ranging from 0.01 M to 1 M.

In one aspect, the method of making the catalyst or catalyst composition comprises adding silicon in any suitable form. In another aspect, silicon can be added using a silica compound, e.g., oxide, chloride, bromide, iodide, fluoride, nitrate, sulfate, perchlorate, acetate, acetyl acetonate, phosphate, carbonate, or the like, or a combination thereof. In a further aspect, the silicon can be in the form of a hydrate. In an even further aspect, the silicon can be in its elemental form. In a yet further aspect, the silicon comprises silica as fumed silica, such as Aerosil® fumed silica.

In one aspect, the silicon can be added to the catalyst or catalyst composition in a solution with a molarity ranging from 0.01 M to 15 M, including exemplary values of 0.02 M, 0.03 M, 0.04 M, 0.05 M, 0.06 M, 0.07 M, 0.08 M, 0.09 M, 0.1 M, 0.15 M, 0.2 M, 0.3 M, 0.4 M, 0.5 M, 0.6 M, 0.7 M, 0.8 M, 0.9 M, 1 M, 1.1 M, 1.2 M, 1.3 M, 1.4 M, 1.5 M, 2 M, 2.5 M, 3 M, 3.5 M, 4 M, 4.5 M, 5 M, 5.5 M, 6 M, 6.5 M, 7 M, 7.5 M, 8 M, 8.5 M, 9 M, 9.5 M, 10 M, 10.5 M, 11 M, 11.5 M, 12 M, 12.5 M, 13 M, 13.5 M, 14 M, and 14.5 M. In a further aspect, the molarity can be in a range derived from any two exemplary values. For example, the silicon can be added to the catalyst or catalyst composition in a solution with a molarity ranging from 0.01 M to 5 M.

In another aspect, $O_x$ is determined by the valence requirements of the other elements present. The $O_x$ can be added separately from the $C_A$ and $C_B$ or in combination with $C_A$ or $C_B$ or both.

In one aspect, the x of the $O_x$ can range from 0 to 10, including exemplary values of 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 3, 4, 5, 6, 7, 8, and 9. In further aspects, the x can be in a range derived from any two exemplary values. For example, the x of the $O_x$ can range from 0.1 to 5.

In one aspect, the catalyst is prepared using any suitable catalyst preparation technique. In another aspect, the catalyst is prepared using by incipient wetness impregnation.

In one aspect, the catalyst is prepared by combining $C_A$ and $C_B$. In a further aspect, $C_A$ and $C_B$ were mixed in an appropriate amount of solvent. The amount of solvent can be determined by the desired concentration of the catalyst. In another aspect, the solvent comprises water, an alcohol, an ether, or an ester, or a combination thereof. In an even further aspect, the solvent comprises water. In one aspect, the solvent consists essentially of water. In another aspect, the solvent consists of water.

In one aspect, the method comprises the further step of removing a solvent from the catalyst or the catalyst composition. In another aspect, the method comprises the further step of removing a solvent from the catalyst or the catalyst composition before the catalyst or catalyst composition is used. In a further aspect, the method comprises the further step of removing a solvent from the catalyst or the catalyst composition after using the catalyst or catalyst composition.

In one aspect, the method comprises removing substantially all of the solvent. In another aspect, the catalyst or the catalyst composition comprise trace amounts of solvent. In a further aspect, the catalyst or the catalyst composition does not comprise a solvent. In an even further aspect, the catalyst or the catalyst composition does not comprise substantially any solvent.

The solvent can be removed by using heating, molecular sieves, filtrating, evaporating, or a vacuum or the like or a combination thereof. In one aspect, the solvent can be removed by drying the catalyst or catalyst composition using heat.

In one aspect, the catalyst or as the catalyst composition are dried at a temperature ranging from 75° C. to 200° C., including exemplary values of 80° C., 85° C., 90° C., 95° C., 100° C., 105° C., 110° C., 115° C., 120° C., 125° C., 130° C., 135° C., 140° C., 145° C., 150° C., 155° C., 160° C., 165° C., 170° C., 175° C., 180° C., 185° C., 190° C., and 195° C. In further aspects, the temperature can be in a range derived from any two exemplary values. For example, the drying temperature can range from 90° C. to 130° C.

In one aspect, the method does not comprise adding a polar organic solvent. In another aspect, the method does not comprise adding substantially any polar organic solvent.

In a further aspect, the method comprises removing any polar organic solvent added to the catalyst or the catalyst composition. In a yet further aspect, the method comprises removing substantially all of any polar organic solvent added to the catalyst or catalyst composition.

In one aspect, the catalyst or the catalyst composition do not comprise a polar organic solvent. In a further aspect, the catalyst or the catalyst composition do not comprise substantially any of a polar organic solvent. In an even further aspect, the catalyst or the catalyst composition comprises trace amounts of a polar organic solvent. In a yet further aspect, the catalyst or the catalyst composition are substantially free of a polar organic solvent.

In one aspect, the polar organic solvent is a solvent comprising a polar organic compound. The polar organic compound can comprise an organic amine, amide, urea, an organic carboxylic acid, an alcohol, an amino acid, a heteroaromatic compound or a surfactant or a combination thereof. In a further aspect, the polar organic compound is urea, a citrate or citric acid or a combination thereof.

In one aspect, after the catalyst has been prepared, the catalyst can be loaded into the reactor for syngas conversion.

In one aspect, the catalyst composition is prepared by combining the catalyst comprising $C_A$ and $C_B$ with the catalyst support. In another aspect, the catalyst support is added by combining the catalyst support with $C_B$. In a further aspect, the catalyst support is added by combining the catalyst support with $C_A$. In a yet further aspect, the catalyst support is added by combining with both $C_A$ and $C_B$ separately.

The catalyst support can be in any form suitable for combining with the final catalyst, $C_A$, or $C_B$ or a combination thereof. In another aspect, the catalyst support comprises magnesia, alumina, silica, zirconia, titania, carbon, or zeolite, or a combination thereof.

In a further aspect, the catalyst support can be in the form of a compound or a complex. In a yet further aspect, the compound or the complex can comprise oxide, chloride, bromide, iodide, fluoride, nitrate, sulfate, perchlorate, acetate, acetyl acetonate, phosphate, carbonate, or the like, or a combination thereof. In an even further aspect, the catalyst support can be added to $C_B$ in the form of magnesium/silica oxide.

In another aspect, the method of making the catalyst composition comprises adding magnesia as a catalyst support in any suitable form. In one aspect, magnesia can be added using a magnesia compound comprising oxide, chloride, bromide, iodide, fluoride, nitrate, sulfate, perchlorate, acetate, acetyl acetonate, phosphate, carbonate, or the like, or a combination thereof. In a yet further aspect, the magnesia can be in the form of magnesium/silica dioxide.

In one aspect, the method of making the catalyst composition comprises adding alumina as a catalyst support in any suitable form. In another aspect, alumina can be added using an alumina compound comprising oxide, chloride, bromide, iodide, fluoride, nitrate, sulfate, perchlorate, acetate, acetyl acetonate, phosphate, carbonate, or the like, or a combination thereof. In a further aspect, the alumina can be in the form of aluminium oxide.

In one aspect, the method of making the catalyst composition comprises adding silica as a catalyst support in any suitable form. In another aspect, silica can be added using a silica compound comprising oxide, chloride, bromide, iodide, fluoride, nitrate, sulfate, perchlorate, acetate, acetyl acetonate, phosphate, carbonate, or the like, or a combination thereof. In a further aspect, the silica can be in the form of silica oxide.

In one aspect, the method of making the catalyst composition comprises adding zirconia as a catalyst support in any suitable form. In another aspect, zirconia can be added using a zirconia compound comprising oxide, chloride, bromide, iodide, fluoride, nitrate, sulfate, perchlorate, acetate, acetyl acetonate, phosphate, carbonate, or the like, or a combination thereof. In a further aspect, the zirconia can be in form of zirconium oxide.

In one aspect, the method of making the catalyst composition comprises adding titania as a catalyst support in any suitable form. In another aspect, titania can be added using a titania compound comprising oxide, chloride, bromide, iodide, fluoride, nitrate, sulfate, perchlorate, acetate, acetyl acetonate, phosphate, carbonate, or the like, or a combination thereof. In a further aspect, the titania can be in the form of titanium oxide.

In one aspect, the method of making the catalyst composition comprises adding carbon as a catalyst support in any suitable form. In another aspect, carbon can be added using a carbon compound comprising activated carbon or nonactivated carbon, or a combination thereof.

In one aspect, the method of making the catalyst composition comprises adding zeolite as a catalyst support in any suitable form. In another aspect, zeolite can be added using a zeolite compound comprising aluminium or silicate. In a further aspect, the zeolite support is in the form of an aluminium silicate zeolite (ZSM).

In one aspect, the catalyst support is present in the catalyst composition in an amount ranging from 1 wt % to 60 wt % based on the total weight of the catalyst composition, including exemplary values of 2 wt %, 3 wt %, 4 wt %, 5 wt %, 10 wt %, 15 wt %, 20 wt %, 25 wt %, 30 wt %, 35 wt %, 40 wt %, 45 wt %, 50 wt %, and 55 wt %. In a further aspect, the range can be derived from any two exemplary values. For example, the catalyst support can be present in the catalyst composition in an amount ranging from 5 wt % to 50 wt %, based on the total weight of the catalyst composition.

The method of making can be used to prepare the catalyst and/or catalyst composition disclosed herein or used by the methods disclosed herein.

D. Methods of Using the Catalyst and Catalyst Composition

In one aspect, the catalyst or catalyst composition can be used to form a product mixture. In another aspect, the product mixture can be formed with low methane formation. In another aspect, the catalyst or catalyst composition can be used to form a product mixture with no or very low carbon dioxide formation. In a further aspect, the catalyst or catalyst composition can be used to form a product mixture with high activity and/or conversion of syngas. In a yet further aspect, the catalyst or catalyst composition can be used to form a product mixture with high total hydrocarbon formation yield.

In one aspect, synthesis gas (or "syngas" or "syn gas") comprises a mixture of primarily hydrogen and carbon monoxide. In another aspect, synthesis gas further comprises, carbon dioxide, methane, water, nitrogen. In an even further aspect, synthesis gas can comprise other constituents, for example, argon or helium. In a yet further aspect, the synthesis gas can be made from natural gas.

In a further aspect, the product mixture comprises an olefin. In another aspect, the product mixture comprises at least one olefin. In one aspect, the product mixture comprises a mixture of olefins. In an even further aspect, the product mixture comprises a mixture of one or more olefins.

In one aspect, one or more olefins can comprise carbons ranging from two carbons to 12 carbons, including 3, 4, 5, 6, 7, 8, 9, 10, or 11 carbons. In one aspect, the range can be derived from any two preceding values. For example, the one or more olefins can comprise carbons ranging from three to eleven carbons.

In one aspect, the one or more olefins can comprise at least one double bond. In another aspect, the olefin comprises two double bonds. In a further aspect, the olefin comprises three double bonds.

In one aspect, the olefin comprises ethylene, propene, 1-butene, 1-pentene, 1-hexene, 1-heptene, 2-ethyl-hexylene, 2-ethyl-heptene, 1-octene, 1-nonene, or 1-decene, or a combination thereof.

In another aspect, the olefin comprises multiple double bonds. In a further aspect, the olefin can be a diolefin, e.g., pentadiene, hexadiene and the like; a cyclic olefin and diolefin, e.g., cyclopentene, cyclopentadiene, cyclohexene, cyclohexadiene, methyl cyclopentadiene and the like; or a cyclic diolefindiene, e.g., dicyclopentadiene, methylcyclopentadiene dimer and the like.

In a further aspect, the product mixture comprises methane. In one aspect, the product mixture comprises a minimal amount of methane. In one aspect, the product mixture does not comprise methane. In another aspect, the product mixture is substantially free of methane. In a further aspect, the product mixture comprises a trace amount of methane.

In an even further aspect, the product mixture comprises carbon dioxide. In another aspect, the product mixture comprises no carbon dioxide. In a further aspect, the product mixture comprises a minimal amount of carbon dioxide. In one aspect, the product mixture does not comprise carbon dioxide. In another aspect, the product mixture is substantially free of carbon dioxide. In a further aspect, the product mixture comprises a trace amount of carbon dioxide.

In a yet further aspect, the product mixture comprises methane and carbon dioxide.

In one aspect, the product mixture consists essentially of carbon dioxide, methane, and one or more olefins. In another aspect, the product mixture consists essentially of methane and one or more olefins. In a further aspect, the product mixture consists essentially of one or more olefins.

In one aspect, the product mixture comprises an optional ingredient. In another aspect, the optional ingredient comprises a paraffin or a hydrocarbon or a combination thereof. In one aspect, the paraffin or hydrocarbon can comprise carbons ranging from two carbons to eight carbons.

In a further aspect, the method comprises the further step of removing a solvent from the catalyst or the catalyst composition after using the catalyst or catalyst composition to produce the product mixture. In an even further aspect, the method can then comprise reusing the catalyst or catalyst composition after removing a solvent from the catalyst or catalyst composition.

In one aspect, the conversion percent of synthesis gas to the product mixture ranges from 30% to 100%, including exemplary values of 35%, 40%, 45%, 50%, 55%, 60%, 65%, 70%, 75%, 80%, 85%, 90%, and 95%. In a further aspect, the range can be derived from any two exemplary values. For example, the conversion percent of synthesis gas to the product mixture ranges from 35% to 100%.

In one aspect, the product mixture comprises an olefin in an amount ranging from 60 wt % to 90 wt %, based on the total weight of the product mixture, including exemplary values of 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, and 89 wt %. In a further aspect, the range can be derived from any two exemplary values. For example, the product mixture comprises an olefin in an amount ranging from 72 wt % to 90 wt %, based on the total weight of the product mixture. In one aspect, this amount represents the total amount of olefin present in the product mixture.

In one aspect, the product mixture comprises carbon dioxide in an amount ranging from 0 wt % to 5 wt %, based on the total weight of the product mixture, including exemplary values of 0.5 wt %, 1 wt %, 1.5 wt %, 2 wt %, 2.5 wt %, 3 wt %, 3.5 wt %, 4 wt %, and 4.5 wt %. In a further aspect, the range can be derived from any two exemplary values. For example, the product mixture comprises carbon dioxide in an amount ranging from 0 wt % to 4 wt %, based on the total weight of the product mixture.

In one aspect, the product mixture comprises methane in an amount ranging from 0 wt % to 20 wt %, based on the total weight of the product mixture, including exemplary wt % values of 0.5, 1, 2, 3, 4, 5, 8, 11, 12, 13, 15, 17, 18, 19 and 20. In a further aspect, the range can be derived from any two exemplary values. For example, the product mixture comprises methane in an amount ranging from 10 wt % to 14 wt %, based on the total weight of the product mixture. The product mixture can comprise methane in an amount ranging from 2 wt % to 20 wt %, based on the total weight of the product mixture.

The methods of using can be performed using the catalysts or the catalyst compositions disclosed herein or made by the methods disclosed herein.

E. Aspects

The disclosed compositions and methods include at least the following aspects.

Aspect 1: A catalyst comprising $C_A C_B O_x$;
wherein:
a. $C_A$ is $Co_a Mn_b X_d$, wherein
X comprises Si, Ti, Cu, Zn, Pd, or La or a combination thereof;
a ranges from 0.8 to 1.2;
b ranges from 0.1 to 1; and
d ranges from 0 to 0.5; and
b. $C_B$ is $Ni_e Cu_f Mg_h Si_m$, wherein
e ranges from about 0.8 to 1.2;
f ranges from 0 to 1;
h ranges from 0 to 0.5; and
m ranges from 0 to 0.5;
wherein $O_x$ is determined by the valence requirements of the other elements present; and;
wherein the catalyst converts synthesis gas to at least one olefin.

Aspect 2: The catalyst of aspect 1, wherein f ranges from 0.1 to 1.

Aspect 3: The catalyst of any of aspects 1-2, wherein h ranges from 0.1 to 0.5.

Aspect 4: The catalyst of any of aspects 1-3, wherein m ranges from 0.1 to 0.5.

Aspect 5: The catalyst of any of aspects 1-4, wherein d ranges from 0.1 to 0.5.

Aspect 6: The catalyst of any of aspects 1-5, wherein the catalyst does not comprise an alkyl or an acyl group.

Aspect 7: A catalyst composition comprising the catalyst of any of aspects 1-6 and comprising a catalyst support comprising magnesia, alumina, silica, zirconia, titania, carbon, or zeolite, or a combination thereof.

Aspect 8: The catalyst composition of aspect 7, wherein the carbon comprises activated carbon or nonactivated carbon, or a combination thereof.

Aspect 9: The catalyst composition of any of aspects 1-8, wherein the catalyst composition does not comprise boehmite.

Aspect 10: The catalyst composition of any of aspects 1-9, wherein the catalyst composition does not comprise a polar organic solvent.

Aspect 11: A method for using a catalyst or catalyst composition comprising:
 a. contacting the catalyst or the catalyst composition of any of aspects 1-10 with a synthesis gas; and
 b. forming a product mixture comprising at least one olefin.

Aspect 12: The method of aspect 11, wherein the at least one olefin comprises carbons ranging from two carbons to 12 carbons.

Aspect 13: The method of any of aspects 11-12, wherein the least one olefin comprises at least one double bond.

Aspect 14: The method of any of aspects 11-13, wherein the olefin comprises ethylene, propene, 1-butene, 1-pentene, 1-hexene, 1-heptene, 2-ethyl-hexylene, 2-ethyl-heptene, 1-octene, 1-nonene, or 1-decene, or a combination thereof.

Aspect 15: The method of any of aspects 11-14, wherein the product mixture comprises methane.

Aspect 16: The method of any of aspects 11-15, wherein the conversion percent of synthesis gas to the product mixture ranges from 30% to 100%.

Aspect 17: The method of any of aspects 11-16, wherein the product mixture comprises at least one olefin in an amount ranging from 60 wt % to 90 wt %, based on the total weight of the product mixture.

Aspect 18: The method of any of aspects 11-17, wherein the product mixture comprises carbon dioxide in an amount ranging from 0 wt % to 5 wt %, based on the total weight of the product mixture.

Aspect 19: The method of any of aspects 11-18, wherein the product mixture comprises methane in an amount ranging from 2 wt % to 20 wt %, based on the total weight of the product mixture.

Aspect 20: The method of any of aspects 11-19, wherein the product mixture consists essentially of carbon dioxide, methane, and one or more olefins.

Aspect 21: The method of any of aspects 11-20, wherein the method comprises the further step of removing a solvent from the catalyst or the catalyst composition.

Aspect 22: The method of aspect 21, wherein the solvent comprises water.

Aspect 23: The method of any of aspects 11-22, wherein the catalyst or the catalyst composition does not comprise a polar organic solvent.

F. Experimental

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Several methods for preparing the compounds of this invention are illustrated in the following Examples. Starting materials and the requisite intermediates are in some cases commercially available, or can be prepared according to literature procedures or as illustrated herein.

The following exemplary compounds of the invention were synthesized. The Examples are provided herein to illustrate the invention, and should not be construed as limiting the invention in any way. The Examples are typically depicted in free base form, according to the IUPAC naming convention. However, some of the Examples were obtained or isolated in salt form.

As indicated, some of the Examples were obtained as racemic mixtures of one or more enantiomers or diastereomers. The compounds may be separated by one skilled in the art to isolate individual enantiomers. Separation can be carried out by the coupling of a racemic mixture of compounds to an enantiomerically pure compound to form a diastereomeric mixture, followed by separation of the individual diastereomers by standard methods, such as fractional crystallization or chromatography. A racemic or diastereomeric mixture of the compounds can also be separated directly by chromatographic methods using chiral stationary phases.

1. Example 1

Preparation of Catalyst Composition CoMnNiMgCuSiO$_2$ a. C$_A$ Precursor

To prepare the C$_A$ precursor, 1.2 g of silica (Aerosil® fumed silica) was added to 100 ml distilled water and kept stirring at room temperature for 2 to 4 hours. The temperature was then raised to 70-80° C. To prepare a premixed second solution, 100 ml of 1 mol aqueous solution of Co(NO$_3$)$_2$.6H$_2$O, and 100 ml of 1 mol aqueous solution of Mn(NO$_3$)$_2$.4H$_2$O were premixed in a round bottom flask and the resulting solution was heated at 70-90° C. A third solution of 210 ml (1 mol) sodium carbonate solution was heated at 70-80° C. The second solution and the third solution were added simultaneously to the first solution, which was continuously stirred while the temperature was maintained at 80° C. The pH was raised to 7.0 and then maintained for half an hour to age the precursor. The precipitate was filtered and then washed several times with warm distilled water. Then, the precipitate was dried at 120° C. for 10 to 18 hrs, subsequently cooked in static air in the furnace from 400 to 600° C. for 15-24 hrs to prepare precursor C$_A$.

b. C$_B$ Precursor

To prepare the C$_B$ precursor, 4.18 ml of magnesium chloride hexahydrate (MgCl$_2$.6H$_2$O) salt was dissolved in 100 ml of distilled water at room temperature. To prepare a premixed second solution, 3.0 g of silica (700 m$^2$/g) was added into 50 ml of distilled water and kept for 2 hrs at room temperature. Then, the Mg solution was added to the silica solution and kept for 4-6 hrs for impregnation at room temperature. Then, 100 ml of 1.0 M ammonia solution was added into the above solution. The solution was then held at room temperature for 1-5 hrs. The solution was then filtered, washed with warm distilled water, and dried for 16-24 hrs at 120° C. A dried Mg/SiO$_2$ cake was finely ground and then calcined at 400° C. Then, 0.84 g of nickel nitrate salt was dissolved in 15 ml of distilled water, and a light greenish clear solution formed at room temperature. Then, 0.31 g of copper nitrate salt was dissolved in 10 ml of distilled water, and a light bluish clear solution formed. Both nitrate solutions were mixed together. The above nitrate solutions were added to the Mg/SiO$_2$ support prepared at the first step, kept for 2-6 hr, dried 16-24 hr at 120° C., and cooked at 500° C. for 4-10 hrs.

c. Catalyst Composition

The precursors $C_A$ and $C_B$ were mixed in an appropriate amount of solvent and stirred for a few hours under controlled condition and dried at 100-120° C. for 7 hrs to 10 hrs and were loaded to the reactor for syngas conversion.

2. Example 2

Preparation of Catalyst Composition CoMnNiMgCuSiO$_2$ a. $C_A$ Precursor

To prepare the $C_A$ precursor, 1.2 g of silica (Aerosil® fumed silica) was added into 100 ml distilled water and kept stirring at room temperature for 2 to 4 hours. The temperature was then raised to 70-80° C. To prepare a premixed second solution, 100 ml of 1 mol aqueous solution of Co(NO$_3$)$_2$.6H$_2$O, and 100 ml of 1 mol aqueous solution of Mn(NO$_3$)$_2$.4H$_2$O were premixed in a round bottom flask and the resulting solution was heated at 70-90° C. A third solution of 210 ml (1 mol) sodium carbonate solution was heated at 70-80° C. The second solution and the third solution were added simultaneously to the first solution which was continuously stirred while the temperature was maintained at 80° C. The pH was raised to 7.0 and then maintained for half an hour to age the precursor. The precipitate was filtered and then washed several times with warm distilled water. Then, the precipitate was dried at 120° C. for 10 to 18 hrs subsequently cooked in static air in the furnace from 400 to 600° C. for 15-24 h to give precursor $C_A$.

b. $C_B$ Precursor

To prepare the $C_B$ precursor, 4.18 ml of magnesium chloride hexahydrate (MgCl$_2$.6H$_2$O) salt was dissolved in 100 ml of distilled water at room temperature. To prepare a premixed second solution, 3.0 g of silica (700 m$^2$/g) was added to 50 ml of distilled water and kept for 2 hr at room temp. Then, the Mg solution was added in silica and kept for 4-6 hr. for impregnation at room temperature. Then, 100 ml of 3.0 M ammonia solution was added to the above solution, and held at room temperature for 1-5 hr under stirring. The solution was then filtered, washed with warm distilled water, and dried for 16-24 hr at 120° C. A dried Mg/SiO$_2$ cake was finely ground and then calcined at 400° C. Then, 0.84 g of nickel nitrate salt was dissolved in 15 ml of distilled water, and a light greenish clear solution formed at room temperature. Then, 0.31 g of copper nitrate salt was dissolved in 10 ml of distilled water, and a light bluish clear solution formed. Both nitrate solutions were mixed together. The above nitrate solutions were added to the Mg/SiO$_2$ support prepared at the first step, kept for 2-6 hr, dried 16-24 hr at 120° C., and cooked at 500° C. for 4-10 hrs.

c. Catalyst Composition

The precursors $C_A$ and $C_B$ were mixed in an appropriate amount of solvent and stirred for a few hours under controlled condition and dried at 100-120° C. for 7 hrs to 10 hrs and were loaded to the reactor for syngas conversion.

3. Example 3

Preparation of Catalyst Composition CoMnNiMgCuSiO$_2$ a. $C_A$ Precursor

To prepare the $C_A$ precursor, 1.2 g of Silica (Aerosil® fumed silica) was added into 100 ml distilled water and kept stirring at room temperature for 2 to 4 hours. The temperature was then raised to 70-80° C. To prepare a premixed second solution, 100 ml of 1 mol aqueous solution of Co(NO$_3$)$_2$.6H$_2$O, and 100 ml of 1 mol aqueous solution of Mn (NO$_3$)$_2$.4H$_2$O were premixed in a round bottom flask and the resulting solution was heated at 70-90° C. A third solution of 210 ml (1 mol) sodium carbonate solution was heated at 70-80° C. The second solution and the third solution were added simultaneously to the first solution which was continuously stirred while the temperature was maintained at 80° C. The pH was raised to 7.0 and then maintained for half an hour to age the precursor. The precipitate was filtered and then washed several times with warm distilled water. Then, the precipitates was dried at 120° C. for 10 to 18 hr subsequently cooked in static air in the furnace from 400 to 600° C. for 15-24 hr to give precursor $C_A$.

b. $C_B$ Precursor

To prepare the $C_B$ precursor, 4.18 ml of magnesium chloride hexahydrate (MgCl$_2$.6H$_2$O) salt was dissolved in 100 ml of distilled water at room temperature. To prepare a premixed second solution, 3.0 g of silica (700 m$^2$/g) was added into 50 ml of distilled water and kept for 2 hrs at room temperature. Then, the Mg solution was added to the silica and kept for 4-6 hrs for impregnation at room temperature. Then, 100 ml of 7.0 M ammonia solution was added to the above solution, and held at room temperature for 1-5 hr under stirring. The solution was then filtered, washed with warm distilled water, and dried for 16-24 hrs at 120° C. A dried Mg/SiO$_2$ cake was finely ground and then calcined at 400° C. Then, 0.84 g of nickel nitrate salt was dissolved in 15 ml of distilled water, and a light greenish clear solution formed at room temp. Then, 0.31 g of copper nitrate salt was dissolved in 10 ml of distilled water, and a light bluish clear solution formed. Both nitrate solutions were mixed together. The above nitrate solutions were added to the Mg/SiO$_2$ support prepared at the first step, kept for 2-6 hr, dried 16-24 hr at 120° C., and cooked at 500° C. for 4-10 hrs.

c. Catalyst Composition

The precursors $C_A$ and $C_B$ were mixed in an appropriate amount of solvent and stirred for few hours under controlled condition and dried at 100-120° C. for 7 to 10 hr and were loaded to the reactor for syngas conversion.

4. Example 4

Preparation of Catalyst Composition CoMnCuZnNiMgSiO$_2$ a. $C_A$ Precursor

To prepare the $C_A$ precursor, 1.5 g zinc nitrate and 1.5 g copper nitrate were added to 1.2 g of silica (Aerosil® fumed silica) and 120 ml of distilled water. The solution was kept stirring at room temperature for 2 to 4 hours, and then the temperature was raised to 70-80° C. To prepare a premixed second solution, 100 ml of 1 mol aqueous solution of Co(NO$_3$)$_2$.6H$_2$O, and 100 ml of 1 mol aqueous solution of Mn(NO$_3$)$_2$.4H$_2$O were premixed in a round bottom flask, and the resulting solution was heated at 70-90° C. A third solution of 210 ml (1 mol) sodium carbonate solution was heated at 70-80° C. The second solution and the third solution were added simultaneously to the first solution, which was continuously stirred while the temperature was maintained at 80° C. The pH was raised to 7.0 and then maintained for half an hour to age the precursor. The precipitate was filtered and then washed several times with warm distilled water. Then, the precipitate was dried at 120° C. for 10 to 18 hr, subsequently cooked in static air in the furnace from 400 to 600° C. for 15-24 h to give precursor $C_A$.

b. $C_B$ Precursor

To prepare the $C_B$ precursor, 4.18 ml of magnesium chloride hexahydrate ($MgCl_2.6H_2O$) salt was dissolved in 100 ml of distilled water at room temperature. To prepare a premixed second solution, 3.0 g of silica (700 m$^2$/g) was added to 50 ml of distilled water and kept for 2 hr. at room temperature. Then, the Mg solution was added to the silica and kept for 4-6 hr for impregnation at room temperature. Then, 100 ml of 1.0 M ammonia solution was added to the above solution, and held at room temperature for 1-5 hr under stirring. The solution was then filtered, washed with warm distilled water, and dried for 16-24 hr at 120° C. A dried Mg/SiO$_2$ cake was finely ground, and then calcined at 400° C. Then, 0.84 g of nickel nitrate salt was dissolved in 15 ml of distilled water, and a light greenish clear solution formed at room temperature. Then, 0.31 g of copper nitrate salt was dissolved in 10 ml of distilled water, and a light bluish clear solution formed. Both nitrate solutions were mixed together. The above nitrate solutions were added to the Mg/SiO$_2$ support prepared at the first step, kept for 2-6 hr, and dried 16-24 hr at 120° C., and cooked at 500° C. for 4-10 hrs.

c. Catalyst Composition

The precursors $C_A$ and $C_B$ were mixed in an appropriate amount of solvent and stirred for few hours under controlled condition and dried at 100-120° C. for 7 to 10 hr and were loaded to the reactor for syngas conversion 5. Example 5

Preparation of Catalyst Composition CoMnCuZnNiMgSiO$_2$ a. $C_A$ Precursor

To prepare the $C_A$ precursor, 1.5 g zinc nitrate and 1.5 g copper nitrate were added to 1.2 g of silica (Aerosil® fumed silica) and 120 ml of distilled water. The solution was kept stirring at room temperature for 2 to 4 hours, and then the temperature was raised to 70-80° C. To prepare a premixed second solution, 100 ml of 1 mol aqueous solution of Co(NO$_3$)$_2$.6H$_2$O, and 100 ml of 1 mol aqueous solution of Mn(NO$_3$)$_2$.4H$_2$O were premixed in a round bottom flask, and the resulting solution was heated at 70-90° C. A third solution of 210 ml (1 mol) sodium carbonate solution was heated at 70-80° C. The second solution and the third solution were added simultaneously to the first solution, which was continuously stirred while the temperature was maintained at 80° C. The pH was raised to 7.0, and then maintained for half an hour to age the precursor. The precipitate was filtered and then washed several times with warm distilled water. Then, the precipitate was dried at 120° C. for 10 to 18 hr, subsequently cooked in static air in the furnace from 400 to 600° C. for 15-24 h to give precursor $C_A$ b. $C_B$ Precursor To prepare the $C_B$ precursor, 4.18 ml of magnesium chloride hexahydrate ($MgCl_2.6H_2O$) salt was dissolved in 100 ml of distilled water at room temperature. To prepare a premixed second solution, 3.0 g of silica (aerosil v-200) was added to 50 ml of distilled water, and kept for 2 hr at room temperature. Then, the Mg solution was added to the silica, and kept for 4-6 hr for impregnation at room temperature. Then, 100 ml of 1.0 M ammonia solution was added to the above solution, and held at room temperature for 1-5 hr under stirring. The solution was then filtered, washed with warm distilled water, and dried for 16-24 hr at 120° C. A dried Mg/SiO$_2$ cake was finely ground, and then calcined at 400° C. Then, 0.84 g of nickel nitrate salt was dissolved in 15 ml of distilled water, and a light greenish clear solution formed at room temp. Then, 0.31 g of copper nitrate salt was dissolved in 10 ml of distilled water, and a light bluish clear solution formed. Both nitrate solutions were mixed together. The above nitrate solutions were added to the Mg/SiO$_2$ support prepared at the first step, kept for 2-6 hr, dried 16-24 hr at 120° C., and cooked at 500° C. for 4-10 hrs.

c. Catalyst Composition

The precursors $C_A$ and $C_B$ were mixed in an appropriate amount of solvent and stirred for a few hours under controlled condition and dried at 100-120° C. for 7 to 10 hr and were loaded to the reactor for syngas conversion.

6. Example 6

Preparation of Comparative Catalyst Composition CoMnSiO$_2$

For the comparative composition, 1.2 g of silica (Aerosil® fumed silica) was added to 100 ml distilled water, and stirred at room temperature for 2 to 4 hours. The temperature was then raised to 70-80° C. To prepare a premixed second solution, 100 ml of 1 mol aqueous solution of Co(NO$_3$)$_2$.6H$_2$O, and 100 ml of 1 mol aqueous solution of Mn(NO$_3$)$_2$.4H$_2$O were premixed in a round bottom flask and the resulting solution was heated at 70-90° C. A third solution of 210 ml (1 mol) sodium carbonate solution was heated at 70-80° C. The second solution and the third solution were added simultaneously to the first solution which was continuously stirred while the temperature was maintained at 80° C. The pH was raised to 7.0, and then maintained for half an hour to age the precursor. The precipitate was filtered and then washed several times with warm distilled water. Then, the precipitate was dried at 120° C. for 10 to 18 hr subsequently cooked in static air in the furnace from 400 to 600° C. for 15-24 hr.

7. Example 7

Preparation of Comparative Catalyst Composition CoMnCuZnSiO$_2$

For the comparative composition, 1.5 g zinc nitrate and 1.5 g copper nitrate were added to 1.2 g of silica (Aerosil® fumed silica) and 120 ml of distilled water, kept stirring at room temperature for 2 to 4 hours, then the temperature was raised to 70-80° C. To prepare a premixed second solution, 100 ml of 1 mol aqueous solution of Co(NO$_3$)$_2$.6H$_2$O, and 100 ml of 1 mol aqueous solution of Mn(NO$_3$)$_2$.4H$_2$O were premixed in a round bottom flask and the resulting solution was heated at 70-90° C. A third solution of 210 ml (1 mol) sodium carbonate solution was heated at 70-80° C. The second solution and the third solution were added simultaneously to the first solution, which was continuously stirred while the temperature was maintained at 80° C. The pH was raised to 7.0, and then maintained for half an hour to age the precursor. The precipitate was filtered and then washed several times with warm distilled water. Then, the precipitate were dried at 120° C. for 10 to 18 hr, subsequently cooked in static air in the furnace from 400 to 600° C. for 15-24 hr.

8. Catalyst Evaluation

The catalysts from examples 1-7 were evaluated as shown in Table 1. Examples 1-5 are inventive, with Examples 6-7 as comparative examples. As can be seen in Table 1, the comparative examples formed a greater weight percentage of carbon dioxide (17 wt % to 28 wt %), compared to the inventive examples which formed carbon dioxide ranging from 0 wt % to 4 wt %. The inventive examples also formed a greater weight percentage of olefins (84 wt % to 86 wt %), compared to the comparative examples with a weight percentage of olefin ranging from 62 wt % to 73 wt %. Without wishing to be bound to this theory, the higher olefin conversion can result from the lower carbon dioxide conversion.

TABLE 1

| Example | Conversion | CO2 [%] | HCs C2-C8 [%] | CH4 [%] |
|---|---|---|---|---|
| Example 1 | 75 | 3 | 86 | 11 |
| Example 2 | 74 | 3 | 86 | 11 |
| Example 3 | 71 | 3 | 85 | 12 |
| Example 4 | 36 | 4 | 84 | 12 |
| Example 5 | 30 | 0 | 86 | 14 |
| Example 6 | 100 | 28 | 62 | 10 |
| Example 7 | 43 | 17 | 73 | 10 |

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A catalyst composition consisting essentially of a formula $C_A C_B O_x$ and a catalyst support; said catalyst consisting of
   a. $C_A$ is $Co_a Mn_b X_d$, wherein
      X comprises Si, Ti, Cu, Zn, Pd, or La or a combination thereof;
      a ranges from 0.8 to 1.2;
      b ranges from 0.1 to 1; and
      d ranges from 0 to 0.5; and
   b. $C_B$ is $Ni_e Cu_f Mg_h Si_m$, wherein
      e ranges from about 0.8 to 1.2;
      f ranges from 0 to 1;
      h ranges from 0 to 0.5; and
      m ranges from 0 to 0.5;
   wherein $O_x$ is determined by the valence requirements of the other elements present;
   wherein in the catalyst support consists essentially of magnesia, alumina, silica, titania, carbon, or zeolite, or a combination thereof; and
   wherein the catalyst composition converts synthesis gas to at least one olefin.

2. The catalyst composition of claim 1, wherein f ranges from 0.1 to 1.

3. The catalyst composition of claim 2, wherein h ranges from 0.1 to 0.5.

4. The catalyst composition of claim 3, wherein m ranges from 0.1 to 0.5.

5. The catalyst composition of claim 4, wherein d ranges from 0.1 to 0.5.

6. The catalyst composition of claim 1, wherein the catalyst does not comprise an alkyl or an acyl group.

7. The catalyst composition of claim 1, wherein the catalyst support comprises carbon comprising activated carbon or nonactivated carbon, or a combination thereof.

8. The catalyst composition of claim 1, wherein the catalyst composition does not comprise boehmite.

9. The catalyst composition of claim 1, wherein the catalyst composition does not comprise a polar organic solvent.

10. A method for using a catalyst composition comprising:
    a. contacting the catalyst composition of claim 1 with a synthesis gas; and
    b. forming a product mixture comprising at least one olefin.

11. The method of claim 10, wherein the at least one olefin comprises carbons ranging from two carbons to 12 carbons.

12. The method of claim 10, wherein the at least one olefin comprises ethylene, propene, 1-butene, 1-pentene, 1-hexene, 1-heptene, 2-ethyl-hexylene, 2-ethyl-heptene, 1-octene, 1-nonene, or 1-decene, or a combination thereof.

13. The method of claim 10, wherein the product mixture comprises methane.

14. The method of claim 10, wherein the conversion percent of synthesis gas to the product mixture ranges from 30% to 100%.

15. The method of claim 10, wherein the product mixture comprises at least one olefin in an amount ranging from 60 wt % to 90 wt %, based on total weight of the product mixture.

16. The method of claim 10, wherein the product mixture comprises carbon dioxide in an amount ranging from 0 wt % to 5 wt %, based on total weight of the product mixture.

17. The method of claim 10, wherein the product mixture comprises methane in an amount ranging from 2 wt % to 20 wt %, based on total weight of the product mixture.

18. The method of claim 10, wherein the product mixture consists essentially of carbon dioxide, methane, and one or more olefins.

19. The method of claim 10, wherein the method comprises the further step of removing a solvent from the catalyst composition.

20. The method of claim 19, wherein the solvent comprises water.

* * * * *

UNITED STATES PATENT AND TRADEMARK OFFICE
CERTIFICATE OF CORRECTION

PATENT NO.       : 9,486,785 B2
APPLICATION NO.  : 14/907854
DATED            : November 8, 2016
INVENTOR(S)      : Khalid Karim et al.

Page 1 of 1

It is certified that error appears in the above-identified patent and that said Letters Patent is hereby corrected as shown below:

In the Claims

In Claim 1, Line 2 found at Column 23, at Line 39, please replace "formula $C_AC_BO_X$" with --catalyst of a formula $C_AC_BO_X$--

Signed and Sealed this
Thirty-first Day of January, 2017

Michelle K. Lee
*Director of the United States Patent and Trademark Office*